(No Model.)

H. D. JUSTI.
SUPPORT AND CARRIER FOR ARTIFICIAL TEETH.

No. 571,166. Patented Nov. 10, 1896.

WITNESSES:
P. F. Eagle,
L. Douville.

INVENTOR
Henry D. Justi
BY
ATTORNEY.

United States Patent Office.

HENRY D. JUSTI, OF PHILADELPHIA, PENNSYLVANIA.

SUPPORT AND CARRIER FOR ARTIFICIAL TEETH.

SPECIFICATION forming part of Letters Patent No. 571,166, dated November 10, 1896.

Application filed June 10, 1896. Serial No. 594,940. (No model.)

*To all whom it may concern:*

Be it known that I, HENRY D. JUSTI, a citizen of the United States, residing in the city and county of Philadelphia, State of Pennsylvania, have invented a new and useful Improvement in Supports and Carriers for Artificial Teeth, which improvement is fully set forth in the following specification and accompanying drawings.

My invention consists of a device adapted for supporting and carrying an artificial tooth, so that the latter can be properly and nicely held for purposes of comparison with other teeth as to color, size, &c., for exhibition, handling, and manipulations, said device being detachable from the tooth and readily applicable to other teeth, and also adapted to have other carriers placed thereon for making a row of teeth when so desired.

Figure 1:
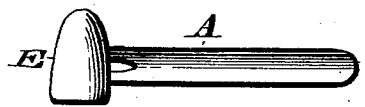
Figure 2:
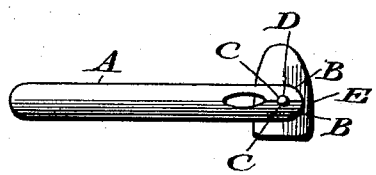
Figure 3:
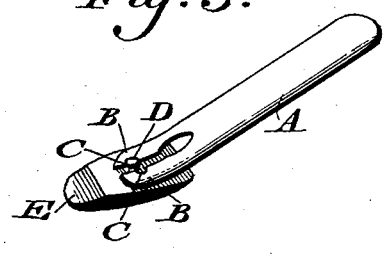
Figure 4:

Figures 1 and 2 represent views of opposite sides of a support and carrier for an artificial tooth embodying my invention. Fig. 3 represents a perspective view showing a carrier detached from a tooth. Fig. 4 represents a side edge view showing a duplication of the carrier and tooth.

Similar letters of reference indicate corresponding parts in the several figures.

Referring to the drawings, A designates a bar or piece of steel or other suitable metal or material, one end of which is longitudinally divided or split, producing the spring-jaws B B, on the inner faces of which is the recess C to receive the pin D on the back of the artificial tooth E.

In order to connect the tooth with the carrier, the jaws of the latter are pressed against the back of the tooth, so as to be opened, and the carrier then pushed forward until the pin D is opposite the recess C, when the pressure on the jaws is released, so that they close and the walls of the recess C embrace said pin, thus causing the jaws to take firm hold of the pin and consequently of the tooth, which latter may be turned on the carrier, owing to the pin D forming an axis whose bearings are the walls of the recess C, so that the tooth may be placed at different angles for purposes requiring the same.

The bar or piece of metal which carries the tooth is channeled in the longitudinal direction thereof when so desired, thus increasing the strength of the bar while reducing the weight thereof, and another bar or piece may be nested or rested thereon, so that a second tooth may be located aside of the tooth E. Each end of the bar may be provided with jaws, such as B, when so desired.

It will be seen that when the bar or piece A is turned outwardly the jaws B, which rest against the tooth, are deflected therefrom in such manner as to open said jaws, whereby the bar may be entirely withdrawn, thus disconnecting the tooth from the carrier.

Having thus described my invention, what I claim as new, and desire to secure by Letters Patent, is—

In a support and carrier for an artificial tooth, a carrying-bar and elastic jaws thereon with a recess in the inner face thereof for receiving a pin on the tooth.

HENRY D. JUSTI.

Witnesses:
ELLWOOD BONSALL,
HENRY M. JUSTI.